(12) United States Patent
Martin

(10) Patent No.: US 7,086,639 B2
(45) Date of Patent: Aug. 8, 2006

(54) LOW ENERGY CONSUMPTION ELECTRIC CONTROL DEVICE FOR FLUSHING SYSTEM

(75) Inventor: Christian Martin, Formerie (FR)

(73) Assignee: Celec Conception Electronique en Aberge Celec, Neufchateleen Bray (FR)

( * ) Notice: Subject to any disclaimer, the term of this patent is extended or adjusted under 35 U.S.C. 154(b) by 50 days.

(21) Appl. No.: 10/998,830

(22) Filed: Nov. 30, 2004

(65) Prior Publication Data
US 2006/0091346 A1   May 4, 2006

(30) Foreign Application Priority Data
Nov. 4, 2004   (FR) .................................. 04 11747

(51) Int. Cl.
*F16K 31/00*   (2006.01)
(52) U.S. Cl. ...................................... 251/339; 251/229
(58) Field of Classification Search ........... 251/129.11, 251/229, 339
See application file for complete search history.

(56) References Cited

U.S. PATENT DOCUMENTS 4,927,114 A * 5/1990 Baker et al. ................. 251/240
5,205,540 A * 4/1993 Clapp .......................... 251/339
5,788,219 A * 8/1998 Nakajima .................... 251/339

* cited by examiner

Primary Examiner—Edward K. Look
Assistant Examiner—John K. Fristoe, Jr.
(74) Attorney, Agent, or Firm—Young & Thompson

(57) ABSTRACT

An electric control device (10) for a flushing system, of the type that includes an axial valve (18) whose shutter (22) is controlled by an axial rod (24) that is capable of being moved radially by a finger (26) actuated by an electric actuating device (32). The electric actuating device (32) includes at least one connecting rod (34) of which a first end (36) is articulated by a pivot (38) to the second end of the finger (26) and of which the second end (44) is articulated by a pivot (40) on an eccentric (42) moved by an electric motor (46), in order to generate a back-and-forth movement of the first end (28) of the finger (26) actuating the rod (24) of the shutter.

9 Claims, 5 Drawing Sheets

US 7,086,639 B2

LOW ENERGY CONSUMPTION ELECTRIC CONTROL DEVICE FOR FLUSHING SYSTEM

FIELD OF THE INVENTION

Figure 1:
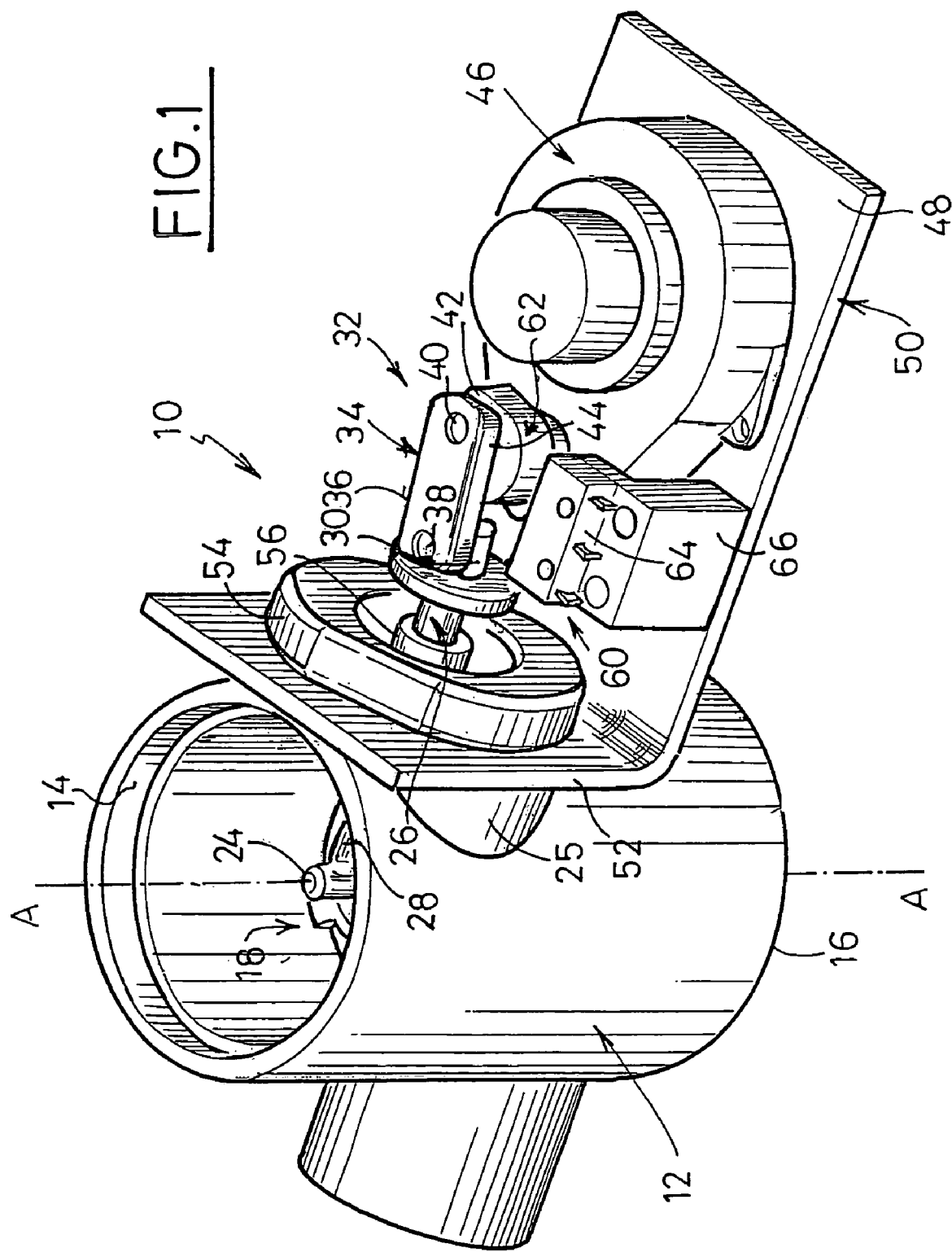

The invention relates to an electric control device for a flushing system.

The invention relates more particularly to an electric control device for a flushing system of the type that comprises a substantially tubular axial flushing body that comprises a top water inlet and a bottom water outlet between which is interposed inside the body an axial valve of the type in which the axial valve comprises an annular seat connected to the body that is capable of being selectively shut off by a plate shutter connected to an axial rod which is capable of being moved radially to allow the shutter to tilt and to detach itself from the seat in such a manner as to allow the water to pass between the top water inlet and the bottom water outlet, of the type in which the body comprises at least one radial duct in which there is a mobile finger of which a first end is capable of pushing the rod of the shutter and of which the second end protrudes in a sealed manner outside the body and is integral with an electric actuating device.

BACKGROUND OF THE INVENTION

Numerous examples of devices of this type are known.
Documents US-A1-2004//01164260 and US-B2-6.757.919 describe and represent such devices.

They are devices in which a rotary cam directly actuates the second end of the actuating finger that is intended to act on the rod of the shutter. The actuating finger is returned by a return spring.

This design has the disadvantage of constantly subjecting the finger, and consequently the cam, to the return force exerted by the spring. As a result, such a device has to provide a motor to drive the cam which is relatively powerful and consequently not very energy-efficient.

In particular, when it is intended for self-contained use, such a design requires the employment of motor supply batteries that are costly and bulky.

Also known in the prior art are designs according to which the actuating finger is directly acted upon by an electromagnet and is itself returned by a return spring. To keep the flushing system open for sufficiently long to achieve a satisfactory flow, the electromagnet must be acted upon continuously and it is therefore for this reason also not very energy-efficient.

SUMMARY OF THE INVENTION

The invention proposes to remedy this disadvantage with the aid of an electric control device of a flushing system of the type previously described which uses a low energy consumption electric actuating device which allows it to be installed in a self-contained manner in public places at less cost.

With this aim, the invention proposes an electric control device of a flushing system of the type previously described, characterized in that the electric actuating device comprises at least one connecting rod of which a first end is articulated by a pivot to the second end of the finger and of which the second end is articulated by a pivot on an eccentric moved by an electric motor in order to generate a back-and-forth movement of the first end of the finger actuating the rod of the shutter.

According to other features of the invention:

the motor is supported by a branch of a bracket-shaped plate whose other branch is secured to the radial duct by a nut, a sealing element is attached to the end of the radial duct and traversed by the finger and is held by the nut to provide the guidance and sealing of the finger, the device comprises an electronic control unit that is capable of starting the electric motor in response to information of detection of a user of the flushing system supplied by an associated sensor, the device comprises detection means which are capable of detecting that the finger has made a back-and-forth movement to cause the motor to stop.

the detection means comprise:
  a cam, which is attached to the shaft of the motor, which comprises a single boss, and of which one top surface forms the eccentric,
  a switch which is attached to the plate and which is capable of being actuated by the single boss of the cam on each revolution of the eccentric corresponding to each back-and-forth movement of the finger.

the electronic unit controls the starting of the motor by triggering the closure of an self-energized relay interposed in a supply circuit for the motor, the switch is interposed in the supply circuit for the motor and for the self-energized relay so that the information according to which the finger has made a back-and-forth movement corresponds to an interruption of the supply current to the motor and to the self-energized relay.

BRIEF DESCRITOPN OF THE DRAWINGS

Figure 2:
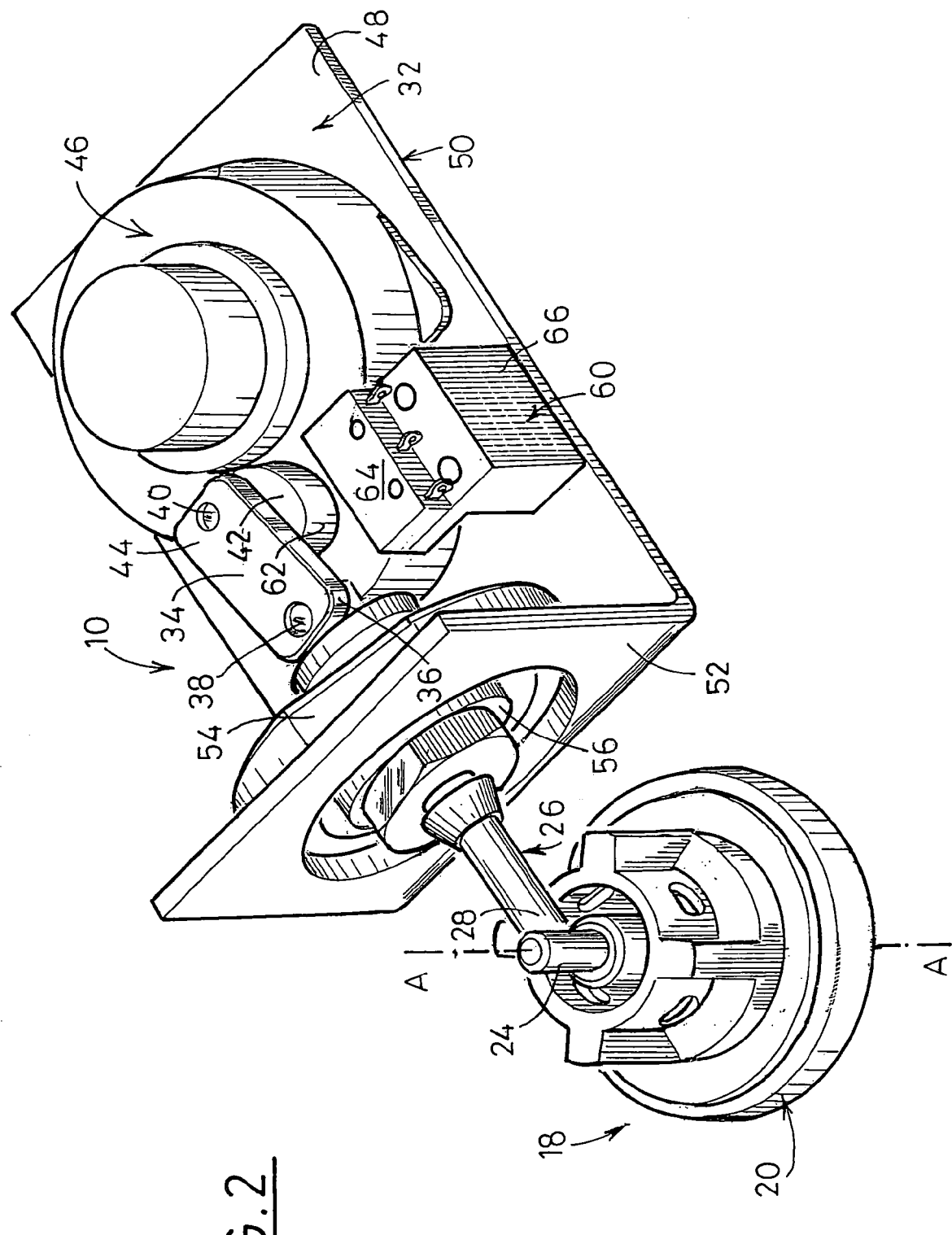
Figure 3:
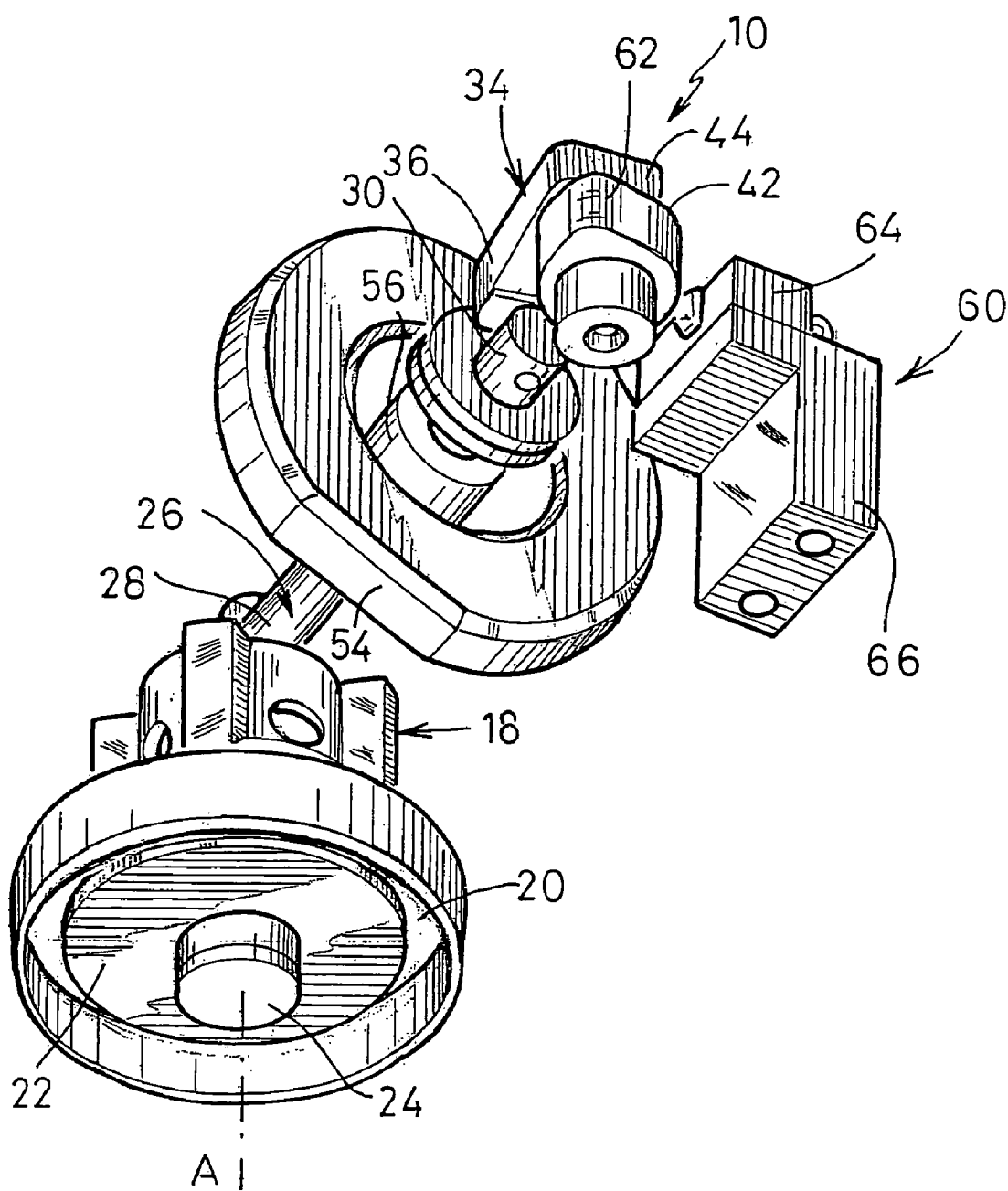
Figure 4:
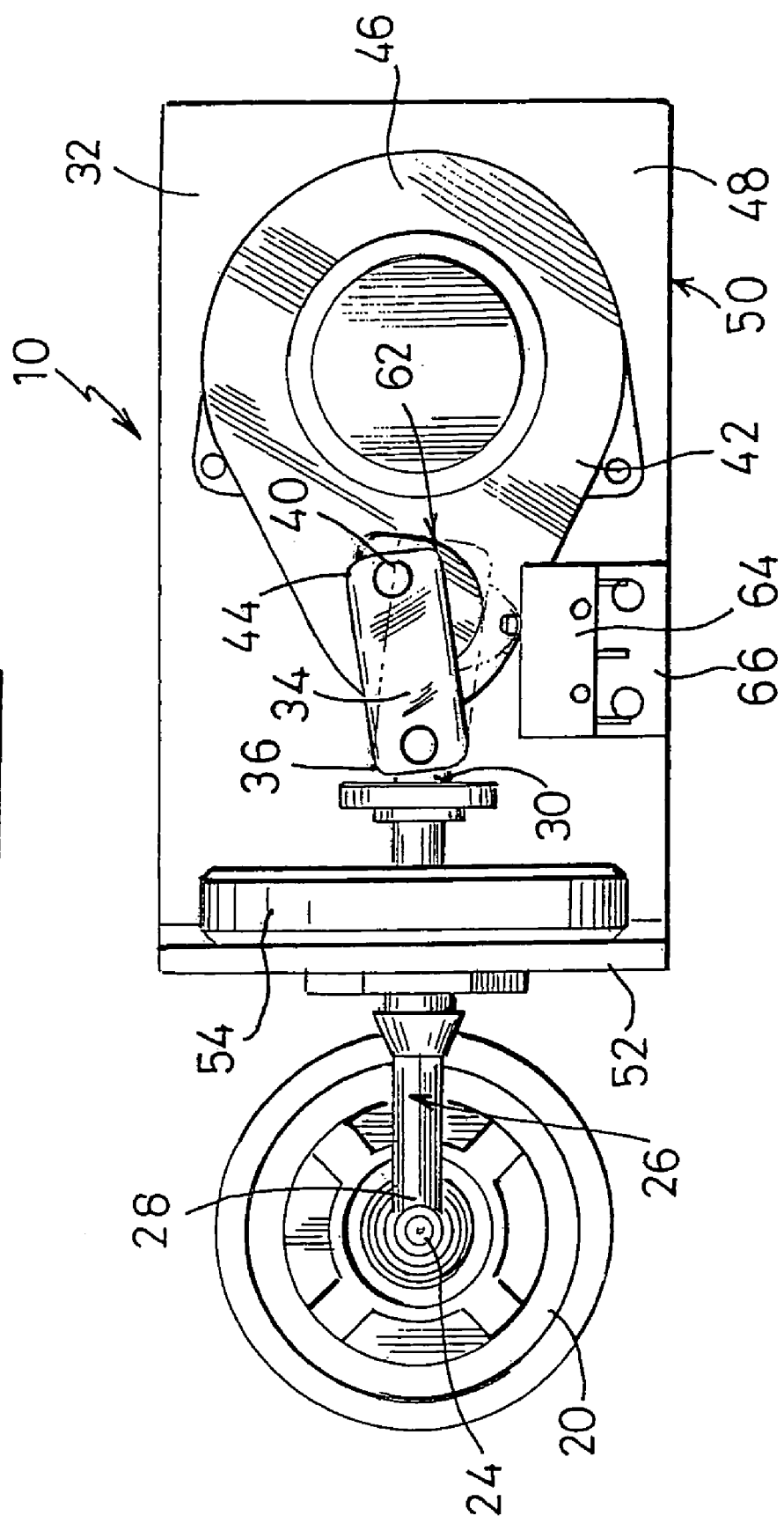
Figure 5:
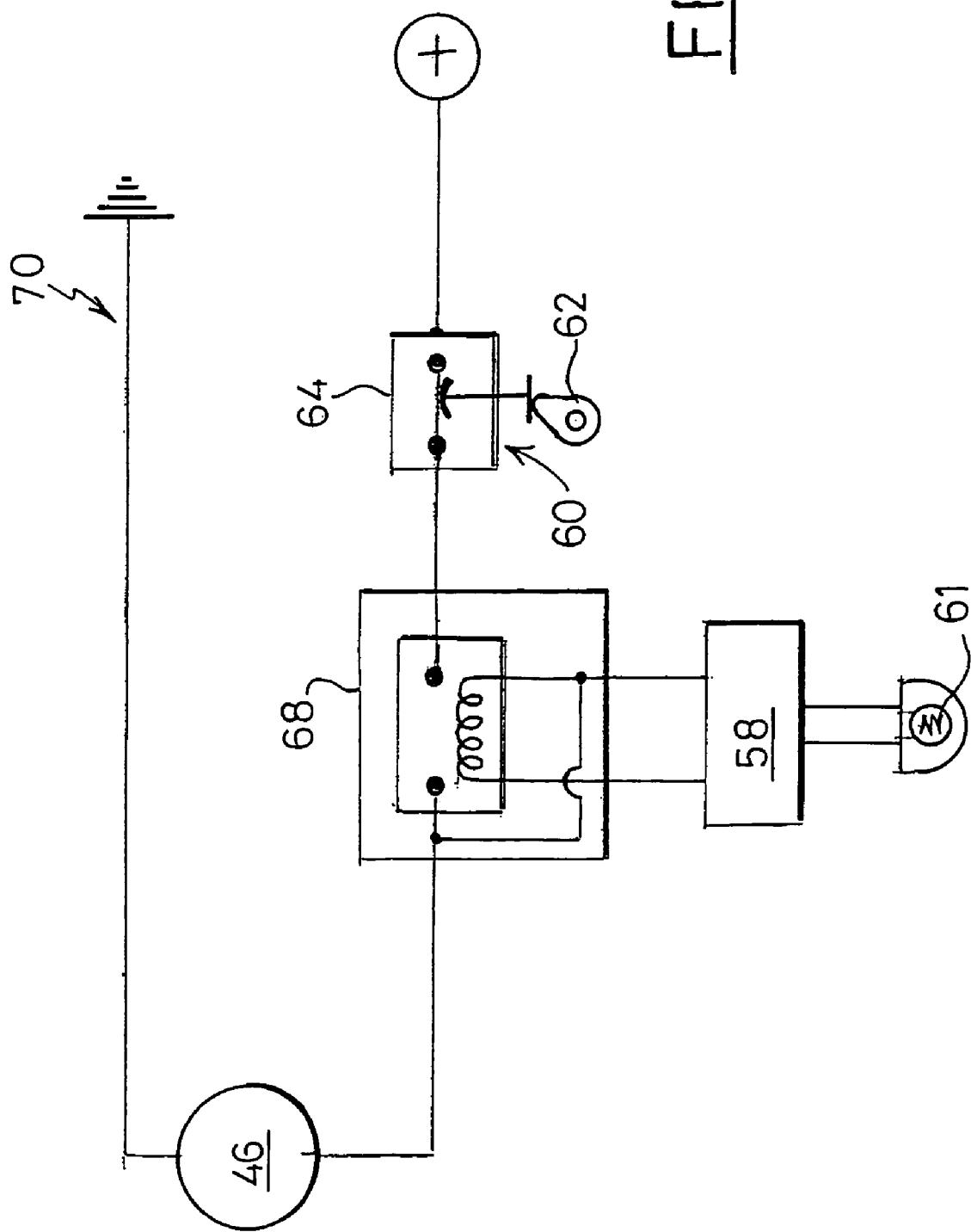

Other features and advantages of the invention will appear on reading the detailed description that follows for an understanding of which reference will be made to the appended drawings in which:

FIG. 1 is a top view in perspective of a device according to the invention,

FIG. 2 is a top view in perspective of the device according to the invention from which the flushing body has been removed, FIG. 3 is a bottom view in perspective of the device according to the invention from which the flushing body has been removed, FIG. 4 is a top view of the device according to the invention from which the flushing body has been removed, FIG. 5 is an exemplary electric diagram of control of the electric motor of the flushing device according to the invention.

DETAILED DESCRITOPN OF THE INVENTION

In the description that follows, identical reference numbers indicate pieces that are identical or have similar functions.

FIG. 1 shows an electric control device 10 of a flushing system. In a known manner, the device 10 comprises a substantially tubular axial flushing body 12 of axis "A" which comprises a top water inlet 14 and a bottom water outlet 16. The top water inlet 14 consists for example simply of a top end orifice of the tubular flushing body 12 and the bottom water outlet 16 consists for example simply of a bottom end orifice of the tubular flushing body 12.

As illustrated in FIG. 1, an axial valve 18 is interposed inside the body 12 between the water inlet 14 and the water outlet 16. As illustrated in FIG. 3, this axial valve 18 comprises an annular seat 20 connected to the body 12 that is capable of being selectively shut off by a plate shutter 22 connected to an axial rod 24 that is capable of being moved radially to allow the shutter 22 to tilt and to detach itself from the seat 20 in such a manner as to allow the water to pass between the top water inlet 14 and the bottom water outlet 16.

In a known manner, as shown in FIG. 1, the body 12 comprises at least one radial duct 25 in which there is a mobile finger 26 of which a first end 28 is capable of pushing the rod 24 of the shutter 22 and of which the second end 30 projects in a sealed manner outside the body and is integral with an electric actuating device 32.

In a conventional manner, the electric actuating devices 32 according to the state of the art usually comprise a rotary cam which directly actuates the second end 30 of the actuating finger 26. The actuating finger 26 is returned by a return spring.

This design has the disadvantage of constantly subjecting the finger 26, and consequently the cam, to the return force exerted by the return spring. As a result, such a device has to provide a motor to drive the cam. This motor must be relatively powerful and as a result it is not very energy-efficient.

In particular, when it is intended for self-contained use, such a design requires the employment of motor supply batteries that are costly and bulky.

Also known from the prior art are designs according to which the actuating finger 26 is directly acted upon by an electromagnet and still returned by a return spring. These designs are not energy-efficient.

The invention proposes to remedy this disadvantage with the aid of an electric control device 10 of a flushing system of the type previously described which uses a low energy consumption electric actuating device 32 which allows it to be installed in a self-contained manner in public places at less cost.

As a result, the electric control device 10 of a flushing system according to the invention is noteworthy in that the electric actuating device 32 comprises at least one connecting rod 34 of which a first end 36 is articulated by a pivot 38 to the second end 30 of the finger 26 and of which the second end 44 is articulated by a pivot 40 on an eccentric 42 moved by an electric motor 46, in order to generate a back-and-forth movement of the first end 28 of the finger 26 actuating the rod 24 of the shutter.

The advantage of this new design over the devices known from the prior art is that the connecting rod 34 provides both the action on and the return of the finger 26. Thus, it is not necessary to employ any return spring of the rod 26 as is the case in the devices known in the prior art.

Thus, in addition to saving a spring, this design can be used to avoid overdimensioning the motor 46 to counteract the return force of any spring during the action on the rod 26, since this very spring is missing. The motor 46 may therefore be a motor that consumes relatively little energy operating on a low voltage current, which makes it possible to envisage the installation of a flushing device of this type in all locations without having to have recourse to an electric supply connected to the mains, but on the contrary by using a simple battery or solar panel supply.

More particularly, as shown in FIGS. 1 and 2, the motor 46 is supported by a branch 48 of a bracket-shaped plate 50 whose other branch 52 is secured to the radial duct 25 by a nut 54.

To prevent the water passing through the flushing body 12 to the motor 46, a sealing element 56 is advantageously attached at the end of the radial duct 25, is traversed by the finger 26, and is held by the nut 54 to provide the guidance and sealing of the finger 26. This element is for example made of an elastomer and has the form of a nipple which is traversed by the finger 26.

An important feature of the invention is that it can be used to control a single back-and-forth movement of the finger 26 with each actuation of the flushing system device 10 in order to avoid successive actuations of the flushing system device.

As a result, as FIG. 5 shows as an example and in a manner not limiting the invention, the device 10 comprises an electronic control unit 58 which is capable of starting the electric motor 46 in response to information of detection of a user of the flushing system supplied by an associated sensor 61.

The sensor 61 consists for example of a photoelectric cell that is capable of sending the detection information to the electronic control unit 58 so that the latter may trigger the starting of the electric motor 46.

However, it is important that the electric motor 46 operates only for a limited period corresponding to a single back-and-forth movement of the finger 26 in order to avoid successive actuations of the flushing system device 10.

As a result, as the figures show, the device 10 comprises detection means 60 which are capable of detecting that the finger 26 has made one back-and-forth movement to cause the motor 46 to stop.

As a result, the detection means 60 comprise:

a cam 62 which is attached to the shaft of the motor 46, which comprises a single boss, and of which one top surface forms the eccentric 42, a switch 64 that is attached to the plate 32 for example by means of a bracket 66 attached to the plate 50 and which is capable of being actuated by the single boss of the cam 62 on each revolution of the eccentric 46 corresponding to each back-and-forth movement of the finger 26.

In this configuration, the electronic unit 58 controls the starting of the electric motor 46 by triggering the closure of an self-energized relay 68 which is interposed in a supply circuit 70 for the motor 46. The motor 46 runs until the cam 62 actuates the switch 64.

As FIG. 5 illustrates in a manner not limiting the invention, the switch 64 is interposed in series in the supply circuit 70 for the motor 46 upstream of the self-energized relay 68 so that the information according to which the finger 26 has made one back-and-forth movement corresponds to an interruption of the supply current to the motor 46 and to the self-energized relay 68.

When the cam 62 has made one revolution and the finger 26 has therefore made one back-and-forth movement, the switch 64 is opened by the cam 62 which causes the supply for the motor 46 and for the relay 68 to be disconnected, so that, no longer being self-energized, they are again open.

It will of course be understood that the circuit 70 would not be limited to the embodiment described with reference to FIG. 5 and that any embodiment of a control of the motor 58 operating according to the same principle, that is to say according to which the motor 58 is started by a sensor 60 and stopped by an actuation of the switch 64 by the cam 62, may be suitable for the correct embodiment of the invention.

The invention therefore can be used to very simply provide electric control of a flushing system.

The invention claimed is:

1. Electric control device (10) of a flushing system, of the type that comprises a substantially tubular axial flushing body (12) that comprises a top water inlet (14) and a bottom water outlet (16) between which is interposed inside the body (12) an axial valve (18) of the type in which the axial valve (18) comprises an annular seat (20) connected to the body (12) that is capable of being selectively shut off by a plate shutter (22) connected to an axial rod (24) which is capable of being moved radially to allow the shutter (22) to tilt and to detach itself from the seat (20) in such a manner as to allow the water to pass between the top water inlet (14) and the bottom water outlet (16), of the type in which the body (12) comprises at least one radial duct (25) in which there is a mobile finger (26) of which a first end (28) is capable of pushing the rod (24) of the shutter (22) and of which the second end (30) protrudes in a sealed manner outside the body (12) and is integral with an electric actuating device (32), characterized in that the electric actuating device (32) comprises at least one connecting rod (34) of which a first end (36) is articulated by a pivot (38) to the second end of the finger (26) and of which the second end (44) is articulated by a pivot (40) on an eccentric (42) moved by an electric motor (46) in order to generate a back-and-forth movement of the first end (28) of the finger (26) actuating the rod (24) of the shutter.

2. Device (10) according to claim 1, characterized in that the motor (46) is supported by a branch (48) of a bracket-shaped plate (50) whose other branch (52) is secured to the radial duct (25) by a nut (54).

3. Device (10) according to claim 2, characterized in that a sealing element (56) is attached to the end of the radial duct (25) and traversed by the finger (26) and is held by the nut (54) to provide the guidance and sealing of the finger (26).

4. Device (10) according to claim 1, characterized in that it comprises an electronic control unit (58) that is capable of starting the electric motor (46) in response to information of detection of a user of the flushing system supplied by an associated sensor (61).

5. Device (10) according to claim 4, characterized in that it comprises detection means (60) which are capable of detecting that the finger (26) has made a back-and-forth movement to cause the motor (46) to stop.

6. Device (10) according to claim 5, characterized in that the detection means (60) comprise:

a cam (62) which is attached to the shaft of the motor (46), which comprises a single boss, and of which one top surface forms the eccentric (42), a switch (64) which is attached to the plate (32) and which is capable of being actuated by the single boss of the cam (62) on each revolution of the eccentric (46) corresponding to each back-and-forth movement of the finger (26).

7. Device (10) according to claim 6, characterized in that the electronic unit (58) controls the starting of the motor (46) by triggering the closure of an self-energized relay (68) interposed in a supply circuit (70) for the motor (46).

8. Device (10) according to claim 7, characterized in that the switch (64) is interposed in the supply circuit (70) for the motor (46) and for the self-energized relay (68) so that the information according to which the finger (26) has made a back-and-forth movement corresponds to an interruption of the supply current to the motor (46) and to the self-energized relay (68).

9. Device (10) according to claim 4, characterized in that the electronic unit (58) controls the starting of the motor (46) by triggering the closure of an self-energized relay (68) interposed in a supply circuit (70) for the motor (46).

* * * * *